Nov. 24, 1931.    P. RUDOLPH    1,833,593
PHOTOGRAPHIC LENS
Filed Oct. 2, 1930
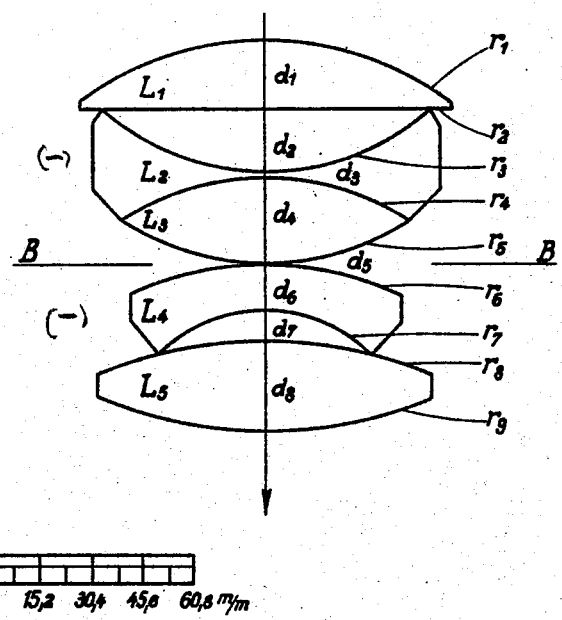
Inventor:
Paul Rudolph Patented Nov. 24, 1931

1,833,593

UNITED STATES PATENT OFFICE

PAUL RUDOLPH, OF GROSSBIESNITZ, NEAR GORLITZ, GERMANY

PHOTOGRAPHIC LENS

Application filed October 2, 1930, Serial No. 485,885, and in Germany October 23, 1929.

The lens is extremely rapid, as it increases the aperture to beyond f:1.

As regards construction the lens is somewhat similar to those lenses consisting of two convexo-concave diverging lenses separated by a biconcave air space, said diverging lenses being enclosed by two collecting lenses with each one convex air space. Whereas in the known lenses of this kind a considerable distance exists between all the lenses, or only the two convexo-concave lenses touch one another, or only the collecting and diverging lenses touch one another, the new arrangement, which will be hereinafter described consists in that all the lens distances are equal to zero, as the biconcave air space has a centre thickness equal to zero and the two air spaces of collecting form are sharp edged. This arrangement requires a certain sequence of radii- and thicknesses of the lenses, which makes it possible to obtain a good spherical, chromatic and astigmatic correction, as also the great relative aperture of f:1 and more. The lenses must however not press one against the other, a minimum distance being practically indispensable.

A sample of the invention is illustrated by way of example in the only figure of the accompanying drawing which shows the objective composed of four lenses separated by air.

The construction data are the following:

Focal distance = 100       Relative aperture f:1

$r_1 = + 98.2$ mm.   $d_1 = 20.1$   $L_1 = L_3 = L_5:$
$r_2 = -446.4$ mm.   $d_2 = 17.9$   $n_D = 1.624\nu = 56.9$
$r_3 = - 74.15$ mm.  $d_3 = 1.8$    $L_2 = L_4$
$r_4 = + 74.15$ mm.  $d_4 = 25.0$   $n_D = 1.624\nu = 35.6$
$r_5 = - 89.3$ mm.   $d_5 = 0$
$r_6 = + 89.3$ mm.   $d_6 = 15.6$
$r_7 = + 53.6$ mm.   $d_7 = 6.7$
$r_8 = +120.5$ mm.   $d_8 = 25.9$
$r_9 = -129.5$ mm.

B is the lens diaphragm.

It is apparent that the lens surfaces have comparatively small curvatures, that best kinds of glass may be used, and that all glass thicknesses are not considerably larger than necessary for the requisite lens diameter. These are properties which facilitate the making of the lenses, and which are essential for a good efficiency of the lens.

In the example, a diverging lens ($L_2$, $L_3$) is cemented of two elements. This can be done for special purposes also at the same time with the second diverging lens or only with this latter. Moreover it is possible to do without any cementing, if the relative aperture of the lens is made smaller, or if as flint glass for $L_2$, $L_3$ or for $L_4$, or also for both lenses, a glass with very strong dispersion is chosen, for example $n_D = 1.715\nu = 29.6$. The fact that the refraction exponent becomes also higher, that is also higher than that of the crown glass $L_1$, $L_3$, $L_5$, does not alter the character of the lens. This also applies with regard to the introduction of different kinds of glass for $L_1$, $L_3$ and $L_5$, also glasses with lower refraction exponents, as also for $L_2$ and $L_4$. Only accordingly slight radii- and thickness alterations might eventually become necessary.

The utilization of a very strong diverging flint glass certainly results in that the slightly greenish color of the glass somewhat reduces the absolute light intensity, but the relative aperture may then be increased beyond f:1.

The question of the diaphragm arrangement B of the lens is solved by the use of an iris diaphragm between the surfaces $r_5$ and $r_6$. This diaphragm should only be capable of shutting down to a certain aperture.

I claim:

A lens for photography and projection, composed of four lenses, separated by air, two of said lenses being convexo-concave diverging lenses facing with their convex surfaces and enclosed by two collecting lenses, in which the biconcave air space between the diverging lenses possesses the centre thickness zero and the two air spaces of collecting shape have at the same time a sharp edge.

In testimony whereof I affix my signature.

P. RUDOLPH.